United States Patent [19]

Blok

[11] 4,062,776
[45] Dec. 13, 1977

[54] SLUDGE CONCENTRATOR AND CONDITIONER

[76] Inventor: Arie Blok, 1422 Overlea Drive, Dunedin, Fla. 33528

[21] Appl. No.: 703,126

[22] Filed: July 7, 1976

[51] Int. Cl.² ............................................. B01D 33/08
[52] U.S. Cl. .................................. 210/205; 210/262; 210/403
[58] Field of Search ............... 210/403, 402, 201, 205, 210/210, 211, 262, 77, 10, 73 S, 326, 393, 411, 71, 65–68, 252, 202

[56] References Cited

U.S. PATENT DOCUMENTS

| 2,750,855 | 6/1956 | Lathrop | 210/403 |
| 3,531,404 | 9/1970 | Goodman et al. | 210/10 |
| 3,875,319 | 4/1975 | Seckler et al. | 210/73 S |
| 3,909,410 | 9/1975 | Neukamm | 210/71 |

FOREIGN PATENT DOCUMENTS

| 2,436,543 | 6/1975 | Germany | 210/403 |
| 1,008,617 | 10/1965 | United Kingdom | 210/403 |

Primary Examiner—Wilbur L. Bascomb, Jr.
Assistant Examiner—Benoit Castel
Attorney, Agent, or Firm—John N. Randolph

[57] ABSTRACT

A rotary driven conical drum into a large end of which sludge and a flocculating polymer are discharged, constitutes a contact chamber, and is equipped with baffles and weirs. The polymer is supplied to a large end of the drum and mixing is accomplished in the large end of the drum where the surface area of the drum is moving most rapidly. Thereafter the mixing action is slowed down by travel of the mixture to the smaller end of the drum, where the surface area of the drum is moving more slowly, to build up the flocs. The sludge/polymer mixture produced in the contact drum is then discharged through a conduit into the large end of a rotary driven conical concentrator drum. A maximum amount of the free water in the mixture is released from the concentrator drum through its screen side wall at the large end of said drum. The flocs remaining in the screen drum, after initial release of the water therefrom, are protected by their travel to the smaller end of the drum where the surface movement is slower. The resulting thickened or dewatered sludge is removed from the smaller end of the concentrator drum as a formed cake.

5 Claims, 7 Drawing Figures

SLUDGE CONCENTRATOR AND CONDITIONER

Summary

It is a primary object of the present invention to provide an apparatus capable of producing a dewatered sludge having a moisture content substantially less than dewatered sludges produced with other apparatus or by other methods.

Another object of the invention is to provide an apparatus having a contact chamber for initially receiving sludge from a treatment plant and also for receiving a flocculating polymer and which is so constructed that a rapid mixing of the sludge and polymer will be initially accomplished, after which the mixing action will be gradually slowed down so that building up of the flocs will not be accomplished too rapidly, to thereby provide flocs which are strong enough to be pressed.

Another object of the invention is to provide such an apparatus having a rotary driven unit to receive the sludge/polymer mixture from the contact chamber and in which the free water is separated quickly from the flocs, and in which the flocs are retained for a sufficient time interval to produce a thickened or dewatered sludge.

Various other objects and advantages of the invention will hereinafter become more fully apparent from the following description of the drawings, illustrating a presently preferred embodiment thereof, and wherein:

The Description of the Preferred Embodiment

Figure 1:
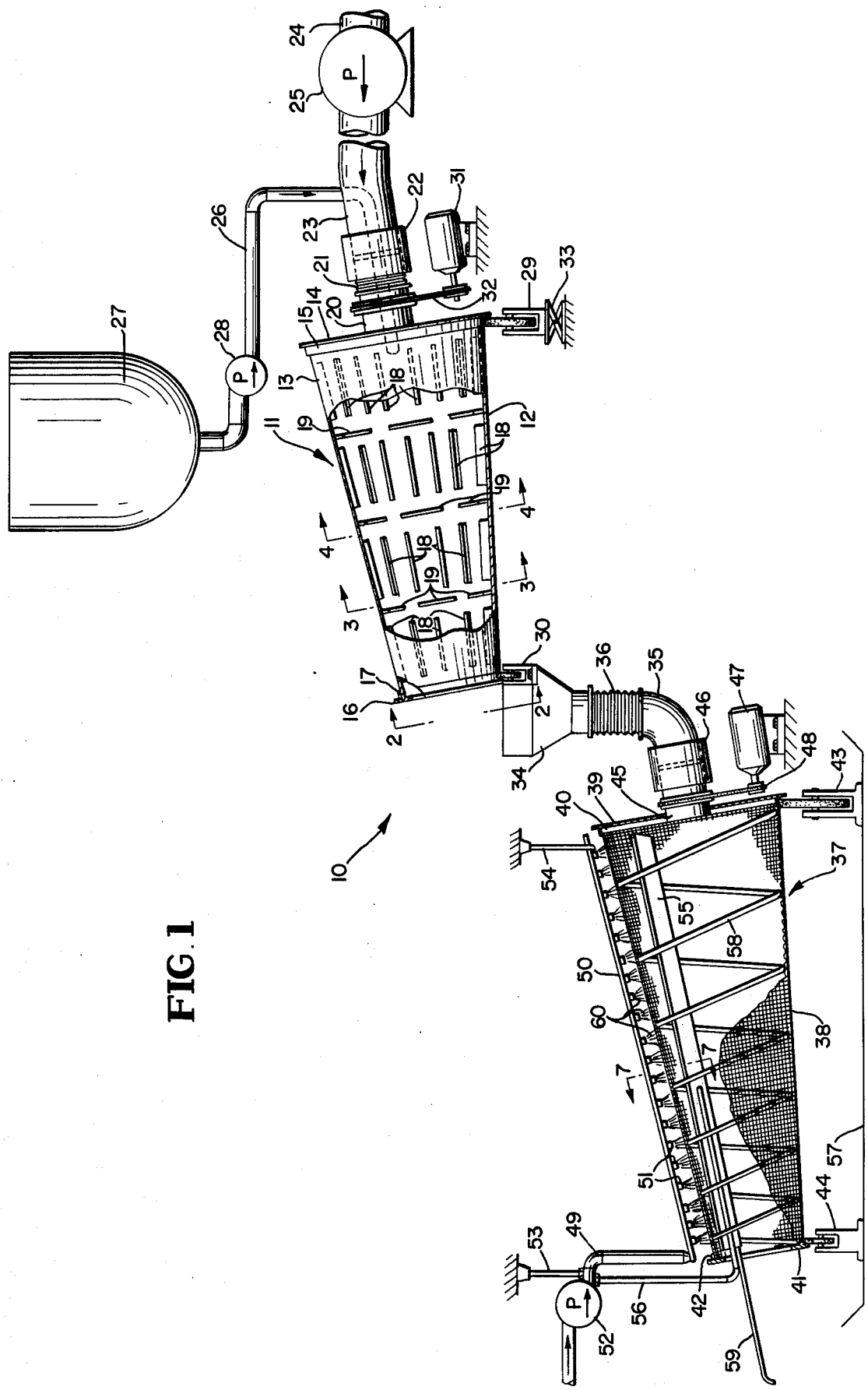
FIG. 1 is a fragmentary side elevational view, partly broken away, of the sludge concentrator and conditioner.
Figure 2:
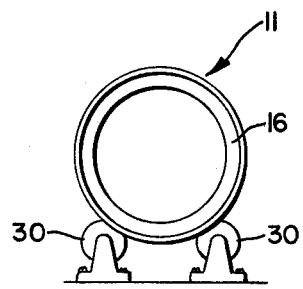
FIG. 2 is an enlarged end elevational view of the smaller discharge end of the contact chamber of the assembly.
Figure 3:
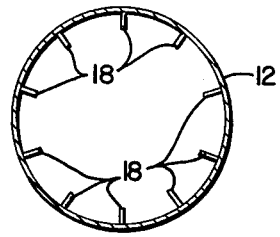
FIGS. 3 and 4 are enlarged cross sectional views of said chambers taken substantially along planes as indicated by the lines 3—3 and 4—4, respectively, of FIG. 1.
Figure 4:
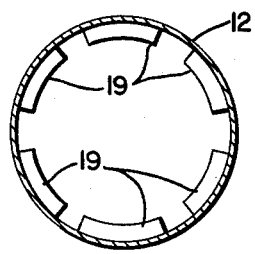
Figure 7:
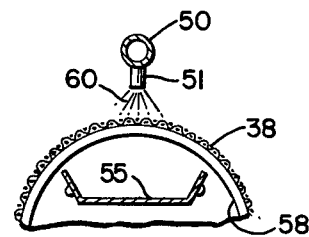
FIG. 7 is an enlarged fragmentary cross sectional view taken substantially along a plane as indicated by the line 7—7 of FIG. 1.
Figure 6:
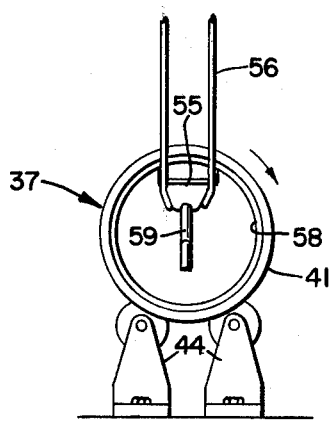
FIG. 6 is a similar view of the other smaller discharge end of said concentrator chamber.
Figure 5:
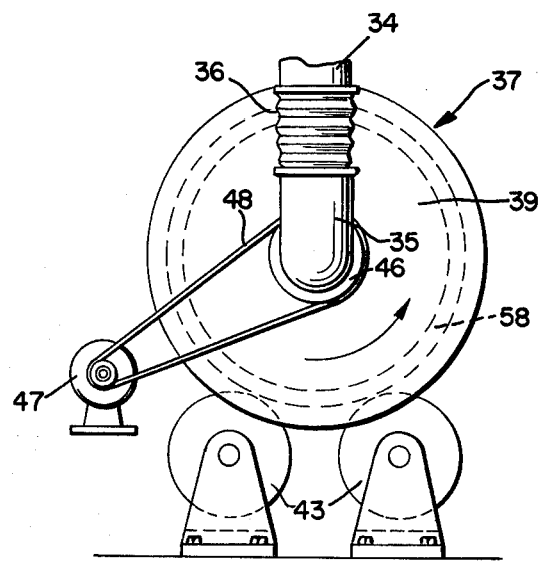
FIG. 5 is an enlarged end elevational view of the larger end of the concentrator chamber, including certain of the parts associated therewith.

Referring more specifically to the drawings, the sludge concentrator and conditioner in its entirety is designated generally 10 and is illustrated in FIG. 1. The apparatus 10 includes a contact chamber 11 in the form of a conical drum 12 having an imperforate wall 13 extending from end to end thereof. An end wall 14 has an annular flange 15 which engages over a large end of the conical wall 13. A ring 16 has an annular flange 17 which engages over the smaller end of the wall 13. The drum 12 is shown provided with four series of baffles 18. The baffles of each series are arranged in circumferentially spaced relationship to one another. A series of circumferentially spaced weirs 19 is interposed between the different series of baffles 18 and, like said baffles 18, are located internally of the drum 12. The number of baffles and weirs of each series diminishes from the large end 14 to the restricted end 16.

A rigid tube 20 extends centrally through the end wall 14 and discharges into the interior of the drum 13. A flexible collar 21 is connected to and forms an extension of the exposed inlet end of the tube 20. A water tight rotary coupling 22 connects the collar 21 to the discharge end 23 of a conduit 24 which leads from a waste water treatment plant, not shown. A pump 25 is interposed in the conduit 24 for pumping the sludge or slurry from the treatment plant to the large inlet end of the contact chamber 11.

A pipe 26 leads from a container 27 for a flocculating polymer and has a portion thereof extending through the discharge end 23 of the conduit 24 and through the coupling 22, collar 21 and tube 20 and discharging into the large end of the chamber 11. All of said portions of the conduit 26 are located between the end wall 14 and pump 25. A pump 28 is interposed in the pipe 26 adjacent the container 27. The pumps 25 and 28 are of the positive displacement type, driven by variable speed motors.

A pair of spaced wheel units 29, the wheels of which engage the flange 15, support the larger end of the drum 12, and a second pair of wheel units 30, the wheels of which engage the flange 17, support the smaller end of the drum 12, for rotation of said drum. The drum 12 is revolved by a variable speed electric motor 31 which is connected to the tube 20 by a belt and pulley drive 32, one pulley of which is secured around the tube 20. The contact chamber 11 slopes downwardly from its large end 14 toward its smaller discharge end 16 and its slope or incline may be varied by adjustment of jacks 33 which support the wheel units 29.

A funnel 34 is positioned to receive the discharge from chamber 11 and has its outlet end connected to one end of an elbow 35 by a flexible hose 36.

A concentrator chamber 37 comprises a conical drum having a mesh wire fabric side wall 38, an end wall 39 connected to a large end of the screen 38 by an annular surrounding flange 40, and a ring 41 connected to the smaller discharge end of the screen 38 by a surrounding flange 42. The concentrator chamber 37 is supported for rotation by a pair of wheel units 43 which engage the flange 40 and a pair of wheel units 44 on which the flange 41 rides.

A rigid tube 45 extends centrally through and is secured in the end wall 39 and has its outer inlet end connected by a water tight rotary coupling 46 to the other end of the elbow 35. A variable speed electric motor 47 drives the chamber 37 through a belt and pulley drive 48, one pulley of which is secured around the tube 45, between the wall 39 and coupling 46.

A conduit 49 has a discharge end terminating in a manifold 50 which is disposes above, adjacent and substantially parallel to the conical screen wall 38 and which is equipped with nozzles 51 positioned to discharge toward the topmost portion of said screen 38, from end to end thereof. A pump 52 is interposed in the conduit 49 to supply liquid under pressure to the nozzles 51. A hanger 53 supports the conduit 49 and a hanger 54 supports the manifold 50 at the end thereof remote from the conduit 49.

A pan 55 is disposed in the upper part of the screen drum 37 beneath and adjacent the nozzles 51. A bracket 56 which is suspended from the conduit 49 has end portions extending into the drum 37 through its open end 41 and which embrace and are secured to the side walls of the pan 55. A sump 57 is disposed beneath the screen drum 37.

A drain pipe 59 extends outwardly through the open lower end 41 of the drum 37 and leads from the lower end of the pan 55. A helical vane 58 is secured within the screen drum 38 and extends from end to end thereof. The spacing between the convolutions of the vane 58 diminishes from the large end to the restricted end of said drum.

The residue from a waste water treatment plant, known as sludge, usually contains less than one per cent of small particles which cannot be removed with a sieve or screen. This residue or sludge is discharged, with a flocculating polymer from the tank 27, into the contact chamber 11. The polymer draws these fine particles together. It is essential that the polymer be added to the sludge as fast as possible initially. Thereafter, the mixing action must be slowed down to build up the flocs which will be destroyed unless the mixing action is slowed down sufficiently. The flocs which are strong enough to be pressed are referred to as "sturdy flocs".

Since the sludge and polymer solution enters the large end 14 of the chamber 11, the surface speed of rotation of this end portion is at a maximum and as this end of the drum contains the most baffles 18 a maximum mixing will be accomplished. As the mixture moves over the weirs 19 to the smaller end of the chamber 11, the slower surface speed of rotation of said chamber end and the fewer available baffles 18 produces a gentler mixing action by means of which the flocs are carefully built up. This result could not be accomplished if it were not for the conical shape of the chamber 11.

A desired sludge/polymer mixture is discharged from the open end 16 of the chamber 11 into the funnel 34 and through the conduit 36, 35, 46, 45 into the large end of the concentrator 38. This large end has the maximum surface area of the screen 37, so that the free water, constituting more than 99 per cent of the mixture, can readily escape from the concentrator 37 into the sump 57. The helical vane 58 divides the chamber 37 into compartments which diminish in width from the large to the smaller end of said chamber and which control and restrict movement of the sludge to the discharge end 41, to permit a maximum amount of water to escape through the screen 38. The surface speed of concentrator 37 will diminish as the flocs move toward the discharge end 41 affording protection to the flocs. Certain sludges will release their water more rapidly than others and for this reason the r.p.m. of the drum 37 may be varied by the motor 47.

The filtrate from the concentrator 37 which is collected in the sump 57 is partially supplied to the nozzles 51 by the conduit 49 and pump 52 and is sprayed in the form of jets 50 onto the top of the screen 38 for cleaning the screen as it revolves. The water from the jets 60 is collected in the pan 55 and conveyed by the drain pipe 59 back to the sewage treatment plant, together with the remainder of the filtrate from the sump 57.

The flocs, as formed cake, are removed from the discharge end 41 of the concentrator chamber 37 to be transported to a digester, truck, container or for further processing in a sludge dewatering installation.

Various modifications and changes are contemplated and may be resorted to, without departing from the function or scope of the invention.

I claim as my invention:

1. A sludge concentrator and conditioner comprising an imperforate conical contact chamber having a large inlet end and a restricted open outlet end, said contact chamber including a conical wall, alternate rows of baffles and weirs mounted internally on said conical wall, said baffles extending longitudinally of said conical wall and being circumferentially spaced from one another, said weirs extending circumferentially of the conical wall and being disposed in end to end relation to one another. means rotatively supporting said contact chamber inclined downwardly from its inlet to its outlet end, means supplying sludge to said inlet end, means supplying a flocculating polymer to said inlet end, means imparting rotation to said contact chamber for mixing the sludge and polymer to create floc and filtrate and for conveying such mixture to the outlet end, a concentrator chamber comprising a conical screen drum having a large inlet end and a restricted open outlet end, said screen drum having a helical vane disposed internally for retarding movement of the mixture toward the outlet end of the concentrator chamber, means rotatively supporting said drum inclined downwardly from said inlet end to said outlet end, a conduit leading from said outlet end of the contact chamber and discharging into said inlet end of the concentrator chamber, and means imparting rotation to the concentrator chamber for conveying the floc toward the open discharge end thereof as the filtrate escapes through the screen.

2. A sludge concentrator and conditioner as in claim 1, means spraying a cleansing liquid along a top portion of a revolving screen drum, and a pan contained within said screen for receiving the cleansing liquid and foreign matter carried thereby.

3. A sludge concentrator and conditioner as in claim 2, a drain pipe leading from the lower end of said pan, and a sump disposed beneath said concentrator for collecting the liquid draining from the screen drum.

4. A sludge concentrator and conditioner as in claim 3, and a pump including conduit means for drawing liquid from said sump and for supplying it under pressure to said spraying means.

5. A sludge concentrator and conditioner as in claim 1, said means imparting rotation to said chambers each including a variable speed power source for varying the speed of rotation of said drums to vary the rate of mixing the sludge and polymer in the contact chamber and the rate of concentration of the floc in said screened drum.

* * * * *